United States Patent [19]
Aulenbacher et al.

[11] Patent Number: 5,452,639
[45] Date of Patent: Sep. 26, 1995

[54] ARRANGEMENT FOR LOCATING BELOW-GROUND AMMUNITION

[75] Inventors: Uwe Aulenbacher, Celle; Helmut Neff, Hermannsburg; Peter Steffen, Celle; Hans-Dieter Liess, Munsing-Seeheim; Manfred Johnk, Kiel, all of Germany

[73] Assignees: TZN Forschungs- und Entwicklungszentrum Unterluss GmbH, Unterluss; Mak System Gesellschaft mbH, Kiel, both of Germany

[21] Appl. No.: 166,343

[22] Filed: Dec. 15, 1993

[30] Foreign Application Priority Data

Dec. 16, 1992 [DE] Germany ............... 42 42 541.7

[51] Int. Cl.⁶ ............................................. F41H 11/16
[52] U.S. Cl. ................................................. 89/1.13; 901/1
[58] Field of Search ................... 86/50; 89/1.13, 89/36.08; 102/362; 901/1

[56] References Cited

U.S. PATENT DOCUMENTS

| | | | |
|---|---|---|---|
| 3,835,371 | 9/1974 | Mirdadian et al. | 324/329 |
| 4,021,725 | 5/1977 | Kirkland | 324/345 |
| 4,351,558 | 9/1982 | Mueller | 89/36.08 |
| 4,766,385 | 8/1988 | Polvani | 324/345 |
| 4,932,831 | 6/1990 | White et al. | 901/1 |
| 5,307,272 | 4/1994 | Butler et al. | 364/423 |

FOREIGN PATENT DOCUMENTS

| | | | |
|---|---|---|---|
| 864008 | 4/1941 | France. | |
| 2135989 | 3/1972 | Germany. | |
| 3432847.C2 | 10/1986 | Germany. | |
| 3526492A1 | 1/1987 | Germany. | |
| 3526492 | 1/1987 | Germany | 89/1.13 |
| 8800815 U | 1/1988 | Germany. | |
| 2215281 | 9/1989 | United Kingdom. | |
| 2259146 | 3/1993 | United Kingdom. | |

OTHER PUBLICATIONS

Popular Mechanics, Jan. 1946, p. 16.
The Washington Daily News, Wednesday, Apr. 16, 1969.

*Primary Examiner*—Stephen C. Bentley
*Attorney, Agent, or Firm*—Spencer, Frank & Schneider

[57] ABSTRACT

In order to be able to automatically locate and map ammunition over a large area without endangering the searching crew, ground-scanning sensors are mounted on a relatively light-weight, unmanned, remote-controlled vehicle which then travels over the area contaminated with ammunition. The controlled vehicle is controlled from, and the sensor signals are evaluated in, a second vehicle which is generally disposed in the immediate vicinity of the area being examined. The controlling vehicle, which is preferably armored, also accommodates the operating crew.

15 Claims, 3 Drawing Sheets

ARRANGEMENT FOR LOCATING BELOW-GROUND AMMUNITION

CROSS-REFERENCE TO RELATED APPLICATION

The present disclosure relates to the subject matter disclosed in German Application No. P 4242541.7 of Dec. 16, 1993, the entire specification of which is incorporated herein by reference.

BACKGROUND OF THE INVENTION

The present invention relates to an arrangement or for locating below-ground ammunition with the aid of sensors.

Such arrangements or devices are disclosed, for example, in German Patent DE 3,432,847.C2 and in German Utility Model Patent G 88/00,815. In these known devices for locating ammunition, the territory to be searched for stray and unexploded ammunition is searched manually, for example with the aid of a magnetic probe, by combat equipment disposal service personnel.

The manual locating method requires the use of experienced probe guides and, for personnel as well as safety reasons, is not suitable, in particular, for working and clearing large, highly contaminated areas.

It is therefore an object of the present invention to provide an arrangement of the above-mentioned type with which it is possible to automatically locate and map ammunition over a large area without endangering the search team.

SUMMARY OF THE INVENTION

The above object generally is accomplished by the present invention by a device for locating below-ground ammunition with the aid of sensors wherein: the device is composed of an arrangement of at least two vehicles; the first vehicle is an unmanned, remote-controlled vehicle on which sensors facing the surface of the ground are disposed; the second vehicle includes the devices required to control the first vehicle and the devices required to evaluate and display the sensor signals; and both vehicles are connected with one another either by way of a radio link and/or a wire connection, and/or a light waveguide connection.

Further particularly advantageous features of the invention will become evident from the description thereof below.

The invention is thus essentially based on the concept of arranging the ground sweeping sensors on a relatively light-weight, unmanned, remote-controlled vehicle (controlled or slave vehicle) which then travels over the area contaminated with ammunition. This vehicle is controlled and the sensor signals are evaluated in a second vehicle (controlling or master vehicle) which is generally disposed in the immediate vicinity of the area to be examined. The controlling vehicle, which is preferably armored, also accommodates the operating crew.

The control of the controlled vehicle as well as the transmission of the sensor signals to the controlling vehicle may occur in each case selectively over a radio link, a wire connection or a light waveguide connection.

Further details and advantages of the invention will become evident from the embodiments to be described below with the aid of drawing figures.

DETAILED DESCRIPTION OF THE PREFERRED EMBODIMENTS

Figure 1:
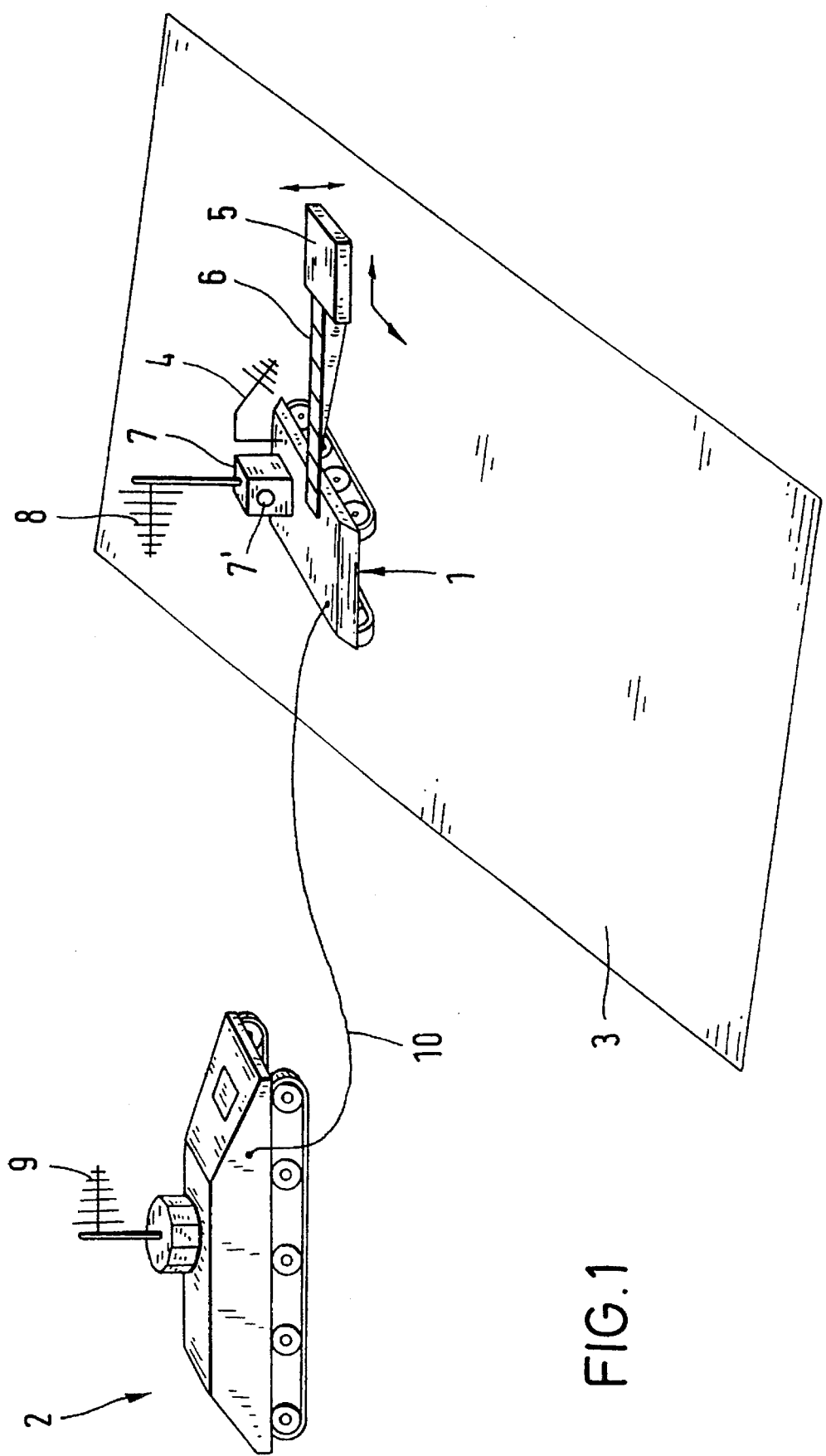
FIG. 1 is a schematic representation of the two vehicles of the arrangement according to the invention during searching over a training area that is contaminated with ammunition.

In FIG. 1, the reference numeral 1 identifies a controlled (slave) vehicle carrying the sensors, and the numeral 2 identifies a controlling (master) vehicle equipped with the devices for evaluation of the data and for controlling the controlled vehicle 1.

Controlled vehicle 1 is disposed in a training field 3 that is contaminated with ammunition. The antennas 4 of a ground radar system as well as one or several arrangements of magnetic sensors (generally coils) may be employed as the sensors. (Regarding the operation of such sensors, please see the above-mentioned German Utility Model Patent G 88/00,815.) The sensors are preferably disposed on a sensor carrier 5 which is mounted on a cantilever arm 6 extending from the vehicle 1. The cantilever arm 6 is variable in height so that sensor carrier 5, and thus also the sensors disposed thereon, move at a constant height above the ground during the travel of vehicle 1. The respective distance of cantilever arm 6 and in particular the sensory or sensor carrier 5 from the ground may here be determined, for example, by means of a laser triangulation in a well known manner. In addition to the sensors, cameras (not shown) for observing the ground likewise may be attached to cantilever arm 6.

Also disposed on the controlled vehicle 1 is a housing 7 for accommodating electronic systems for controlling the vehicle and sensors, respectively, and for pre-processing the signals, a respective vehicle drive, a navigation unit and a sensor system for path measurements. Such systems are per se well known in the art. A camera 7' for guiding the vehicle is also provided at housing 7.

In order to reduce interference with sensors 4 and 5, controlled vehicle 1 preferably is constructed substantially of non-metal materials (wood, plastic).

Data, e.g., both control data and sensor data, can be transmitted between the two vehicles 1 and 2 by way of a radio link indicated by antennas 8 and 9 or also by way of a data and supply line 10, i.e., a wire connection.

Particularly if inhomogeneous, hilly surfaces are involved, it may be of advantage to arrange cantilever arm 6 to be movable, in a known manner, such that, at a given position of controlled vehicle 1, the appropriate movement of the cantilever arm 6 enables the sensors fastened to it to scan a respective partial region of the area to be examined.

Figure 2:
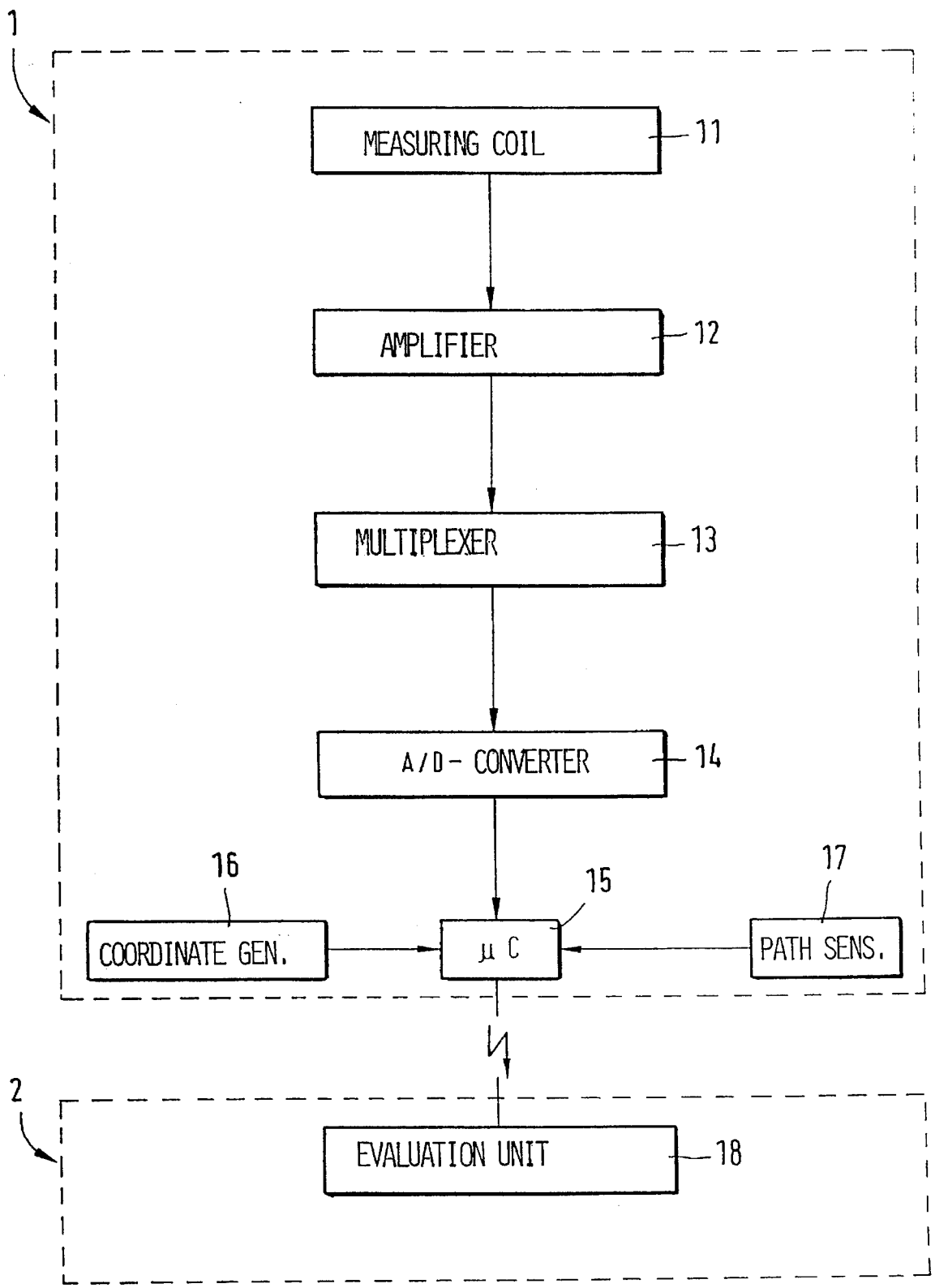
FIG. 2 is a block circuit diagram of a device for evaluating the sensor signals.

The processing of the signals picked up, for example, by means of a magnetic sensor will now be discussed with reference to the block circuit diagram of FIG. 2.

The signals coming from the measuring coil 11 of sensor 5 are initially amplified in an amplifier 12 and then fed by way of a multiplexer 13 (which is connected with further nonillustrated measuring coils) and an analog/digital converter 14 to a microcomputer 15 for pre-processing of the data. In order to precisely localize the objects in the ground, a known so-called differential global positioning system (GPS) 16 is preferably employed and, to determine the paths traveled, a known path sensor arrangement 17 is provided. The respective measured values are associated with the digitized signal values from the measuring coils. As indicated in FIG. 2, all of the above circuit components may be located in the controlled vehicle.

For further evaluation, the picked-up signal values produced in vehicle 1 are transmitted over the radio link to the controlling vehicle 2 and are further processed by means of the digital signal processors of an evaluation and display unit 18.

This evaluation may include, for example, the local changes in the signal values from the measuring coils. For example, the maximum of this signal value curve indicates the updated position of the location beneath the coil where the find (detected ammunition object) was made. The half-width of the curve is a measure for the depth of the detected object, and the total area below the curve is a measure for the size of the object.

The position, probable depth and type of the find may be stored in an appropriate (electronic) card or memory and displayed on a viewing screen or printed out in the form of a map.

Figure 3:
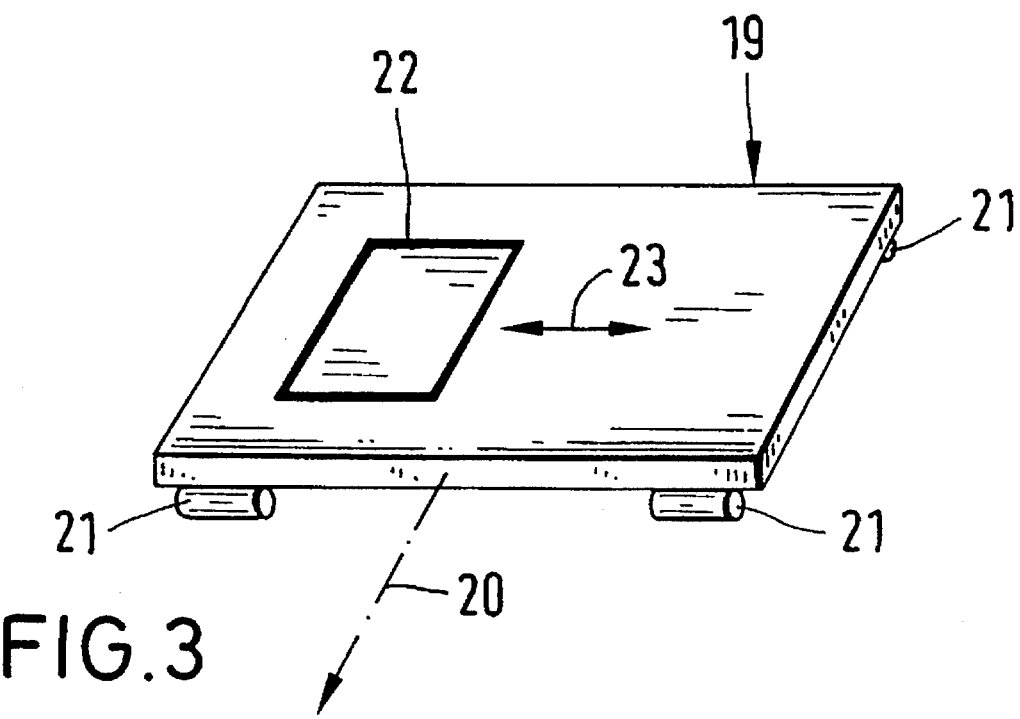
FIG. 3 is a schematic illustration depicting a sensor carrier fastened to the controlled or slave vehicle and provided with a roller guide and a movable coil.

Instead of a variable height sensor carrier 5 (FIG. 1) a sensor carrier including a carriage or roller guide may also be employed, particularly on flat terrain. FIG. 3 shows a corresponding sensor carrier marked 19 which moves on rollers 21 in the direction marked 20. A coil 22 which is mounted on coil carrier 19 by means of a mechanical scanning device and whose direction of movement relative to coil carrier 19 is marked 23, is used as the sensor.

Figure 4:
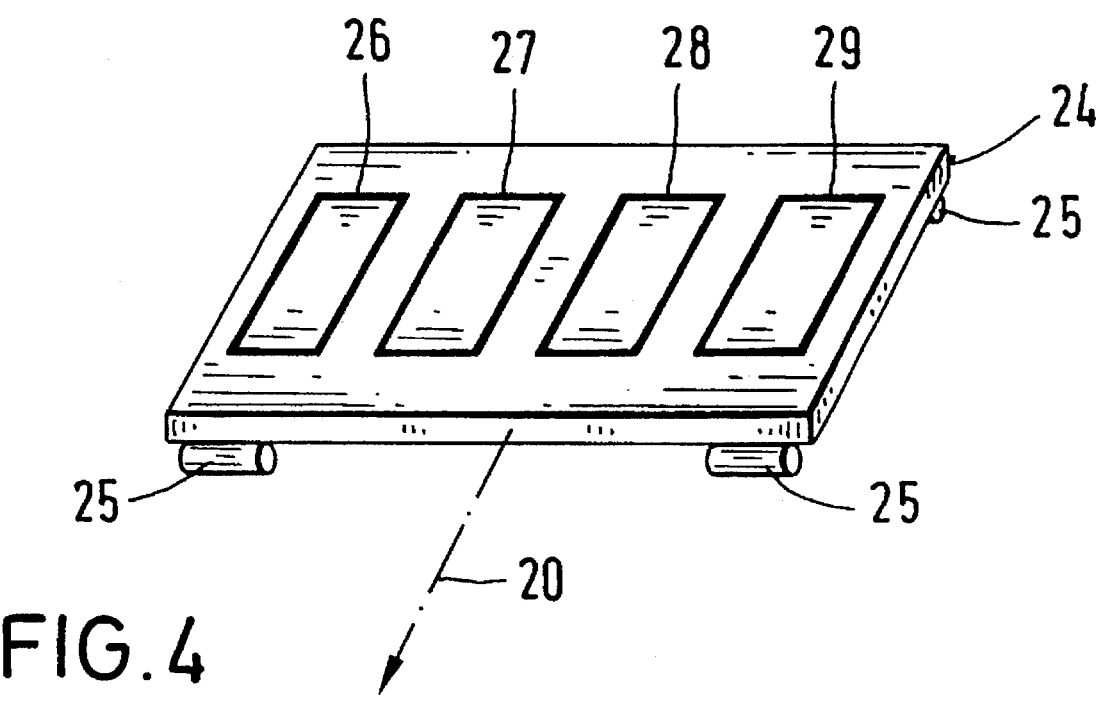
FIG. 4 is a schematic illustration depicting a corresponding sensor carrier provided with a plurality of coils which constitute an array.

FIG. 4 shows a sensor or coil carrier 24 provided with rollers 25 and accommodating a plurality of fixed coils 26 to 29 which constitute an array, so that a mechanical scanning device is not required.

It will be understood that the above description of the present invention is susceptible to various modifications, changes and adaptations, and the same are intended to be comprehended within the meaning and range of equivalents of the appended claims.

What is claimed is:

1. An arrangement for locating below-ground ammunition with the aid of sensors comprising:
    at least first and second vehicles, with said first vehicle being an unmanned, remote-controlled vehicle and said second vehicle being a control vehicle for said first vehicle;
    at least one sensor for detecting below-ground ammunition;
    means for mounting said at least one sensor on said first vehicle so that said at least one sensor is facing the surface of the ground, said means for mounting said at least one sensor including a cantilever arm having one end connected to said first vehicle and having a sensor carrier at its opposite end, said cantilever arm and said sensor carrier being variable in height, and means for varying the height of the sensor for maintaining the distance between sensors on said sensor carrier and the ground constant during travel of said first vehicle;
    devices required to control said first vehicle, and devices required to evaluate and display signals from said at least one sensor disposed on said second vehicle; and
    a radio link, connecting said first and second vehicles to one another for the transmission of data and control signals.

2. An arrangement as defined in claim 1, wherein said first and second vehicles are armored.

3. An arrangement as defined in claim 2, wherein said first vehicle is essentially made of non-metallic materials.

4. An arrangement as defined in claim 1, wherein said first vehicle is essentially made of non-metallic materials.

5. A device as defined in claim 1, wherein said cantilever arm is configured as a mechanical scanning device so that, with said first vehicle in a predetermined position, sensors fastened to said sensor carrier of said cantilever arm scan a partial region of the area to be examined.

6. A device as defined in claim 5, wherein said sensors are movable perpendicular to the direction of movement of said sensor carrier.

7. An arrangement as defined in claim 1, wherein a plurality of identical said sensors are mounted on said sensor carrier in a row extending perpendicular to the direction of movement of said sensor carrier and constitute the elements of a sensor array.

8. An arrangement as defined in claim 1, wherein said sensor carrier includes rollers which travel on the ground in a given direction during movement of said first vehicle.

9. An arrangement as defined in claim 8, wherein said cantilever arm is configured as a mechanical scanning device so that, with said first vehicle in a predetermined position, sensors fastened to said sensor carrier of said cantilever arm scan a partial region of the area to be examined.

10. An arrangement as defined in claim 9, wherein said sensors are movable perpendicular to the direction of movement of said sensor carrier.

11. An arrangement as defined in claim 8, wherein a plurality of identical said sensors are mounted on said sensor carrier in a row extending perpendicular to the direction of movement of said sensor carrier and constitute the elements of a sensor array.

12. An arrangement as defined in claim 1, wherein said at least one sensor on said first vehicle includes a plurality of at least one of coils, antennas and cameras.

13. An arrangement for locating below-ground ammunition with the aid of sensors comprising:
    at least first and second vehicles, with said first vehicle being an unmanned, remote-controlled vehicle and said second vehicle being a control vehicle for said first vehicle;
    at least one sensor for detecting below-ground ammunition;
    means for mounting said at least one sensor on said first vehicle so that said at least one sensor is facing the surface of the ground;
    means for preprocessing sensor signals disposed on said first vehicle and coupled to an output of said at least one sensor for indicating located ammunition, the means for preprocessing including a coordinate generator for locating objects on the ground and a path sensing arrangement for detecting a path of the first vehicle;
    devices required to control said first vehicle, and devices required to evaluate and display signals from said at least one sensor disposed on said second vehicle, the devices required to evaluate and display signals including devices for representing and mapping located ammunition; and a radio link connecting said first and second vehicles to one another for the transmission of data and control signals.

14. An arrangement according to claim 13, wherein the coordinate generator includes a global positioning system.

15. An arrangement for locating below-ground ammunition with the aid of sensors comprising:

at least first and second vehicles, with said first vehicle being an unmanned, remote-controlled vehicle and said second vehicle being a control vehicle for said first vehicle;

at least one sensor for detecting below-ground ammunition;

means for mounting said at least one sensor on said first vehicle so that said at least one sensor is facing the surface of the ground, said means for mounting including a cantilever arm having one end connected to said first vehicle and having a sensor carrier at its opposite end, said sensor carrier including rollers which travel on the ground in a given direction during movement of the first vehicle, the cantilever arm being configured as a mechanical scanning device so that, with said first vehicle in a predetermined position, sensors fastened to said sensor carrier of said cantilever arm scan a partial region of the area to be examined, and the sensors being movable perpendicular to the direction of movement of said sensor carrier;

devices required to control said first vehicle, and devices required to evaluate and display signals from said at least one sensor disposed on said second vehicle; and a radio link connecting said first and second vehicles to one another for the transmission of data and control signals.

* * * * *